(12) United States Patent
Regev et al.

(10) Patent No.: US 10,205,938 B2
(45) Date of Patent: Feb. 12, 2019

(54) METHODS, SYSTEMS, AND COMPUTER READABLE MEDIA FOR MONITORING AND/OR TESTING NETWORK COMMUNICATIONS

(71) Applicant: Ixia, Calabasas, CA (US)

(72) Inventors: Alon Regev, Woodland Hills, CA (US); Stephen Samuel Jackson, Chapel Hill, NC (US); Abhijit Lahiri, Kolkata (IN)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 0 days.

(21) Appl. No.: 14/537,851

(22) Filed: Nov. 10, 2014

(65) Prior Publication Data
US 2016/0134864 A1 May 12, 2016

(51) Int. Cl.
*H04N 17/00* (2006.01)
*H04L 12/26* (2006.01)

(52) U.S. Cl.
CPC ......... *H04N 17/004* (2013.01); *H04L 43/062* (2013.01); *H04L 43/08* (2013.01); *H04L 43/10* (2013.01); *H04L 43/12* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 6,625,648 B1 | 9/2003 | Schwaller et al. | |
| 6,763,380 B1 | 7/2004 | Mayton et al. | |
| 2006/0146703 A1 | 7/2006 | Cha et al. | |
| 2008/0126561 A1 | 5/2008 | Ryu et al. | |
| 2009/0097409 A1 | 4/2009 | Akhter et al. | |
| 2010/0177644 A1 | 7/2010 | Kucharczyk | |
| 2011/0170433 A1 | 7/2011 | Scobbie | |
| 2012/0311132 A1* | 12/2012 | Tychon | H04L 41/5038 709/224 |
| 2014/0169189 A1* | 6/2014 | Kalkunte | H04L 43/10 370/252 |

FOREIGN PATENT DOCUMENTS

KR 10-1401990 B1 6/2014

OTHER PUBLICATIONS

"IEEE Standard for Local and metropolitan area networks—Audio Video Bridging (AVB) Systems," IEEE Standards Association, IEEE Computer Society, IEEE Std 802.1BA™-2011, pp. 1-45 (Sep. 30, 2011).

(Continued)

*Primary Examiner* — Samira Monshi (57) ABSTRACT

Methods, systems, and computer readable media for monitoring and/or testing network communications are disclosed. A method for monitoring network communications includes receiving packets from a network connected device, determining features associated with either the network connected device or a communications network to which the network connected device is connected by actively or passively monitoring or testing the packets, and automatically switching between passively monitoring or testing the packets and actively monitoring or testing the packets in response to receiving a packet carrying instructions.

27 Claims, 4 Drawing Sheets

(56) References Cited

OTHER PUBLICATIONS

"IEEE Standard for Layer 2 Transport Protocol for Time-Sensitive Applications in Bridged Local Area Networks," IEEE Standards Association, IEEE Computer Society, IEEE Std 1722™-2011, pp. 1-57 (May 6, 2011).
"IEEE Standard for Layer 3 Transport Protocol for Time-Sensitive Applications in Local Area Networks," IEEE Standards Association, IEEE Computer Society, IEEE Std 1733™-2011, pp. 1-21 (Apr. 25, 2011).
Teener, Michael Johas, "No-excuses Audio/Video Networking: the Technology Behind AVnu," AVnu™ Alliance White Paper, pp. 1-10 (Aug. 24, 2009).
Notification of Transmittal of the International Search Report and the Written Opinion of the International Searching Authority, or the Declaration for International Application No. PCT/US2015/058297 (dated Feb. 24, 2016).
Communication of European publication number and information on the application of Article 67(3) EPC for European Patent Application No. 15858789.9 (dated Aug. 23, 2017).
Communication of the extended European search report for European Application No. 15858789.9 (dated May 17, 2018).

* cited by examiner

METHODS, SYSTEMS, AND COMPUTER READABLE MEDIA FOR MONITORING AND/OR TESTING NETWORK COMMUNICATIONS

TECHNICAL FIELD

The subject matter described herein relates to monitoring and testing network communications. More specifically, the subject matter relates to methods, systems, and computer readable media for monitoring and testing "Audio Video Bridging" (AVB) network communications.

BACKGROUND

Existing Information Technology (IT) type networks are configured to move data through a network as quickly as possible with minimum cost and minimal management. This is generally sufficient, so long as the data does not include one or more audio/video (A/V) streams having more stringent timing and/or delivery requirements, which overwhelm conventional IT buffers. Even minor delays in the transmission and/or delivery of A/V content as a result of using traditional buffers is unacceptable in high-level and/or high-quality A/V applications.

To overcome the drawbacks of existing IT type networks, "Audio Video Bridging" (AVB) technology has emerged as a solution for delivering "no compromise" streaming quality, characterized by (i) precise synchronization between all networked devices for synchronized endpoint playback of media streams; (ii) traffic shaping for media streams; (iii) reservation or "admission control" for reserving or pre-allocating bandwidth and frequency for transmitting/receiving media streams; and (iv) identification of non-participating (i.e., "non-AVB") devices within the network. AVB networks implement a set of protocols being developed by the IEEE 802.1 Audio/Video Bridging Task Group.

Issues arise when attempting to use and/or allocate resources within an AVB network efficiently. In particular, challenges exist in negotiating control plane traffic and synchronizing the time base between networked devices. Currently, there is not an efficient system and/or method for monitoring and testing the AVB network or the networked devices prior to communicating a media stream through the network; thus, there is not an adequate level of assurance in meeting and/or adhering to stream reservation protocols.

Accordingly, a need exists for improved methods, systems, and computer readable media for monitoring and testing network communications.

SUMMARY

Methods, systems, and computer readable media for monitoring and/or testing network communications are disclosed. According to one method for monitoring network communications, the method includes, at a computing platform, receiving packets from a network connected device, determining performance metrics associated with either the network connected device or a communications network to which the network connected device is connected by actively or passively monitoring or testing the packets, and automatically switch between passively monitoring or testing the packets and actively monitoring or testing the packets in response to receiving a packet carrying instructions.

According to one system for monitoring network communications, the system comprises a computing platform comprising at least one processor, and a monitoring and testing module (MTM) implemented via the at least one processor. The MTM is configured to receive packets from a network connected device, determine various features or performance metrics associated with either the network connected device or a communications network to which the network connected device is connected by actively or passively monitoring or testing the packets, and automatically switch between passively monitoring or testing the packets and actively monitoring or testing the packets in response to receiving a packet carrying instructions.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

As used herein, the term "link" refers to any path, route, or type(s) of connection between devices. For example, a link may include one or more communications nodes, networks, or media, such as a wire, cable, fiber optics, radio, or other medium. In a second example, a link may also include a trunk and/or logical connection.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for monitoring and testing network communications. In some embodiments, the methods and systems described herein are configured to monitor and test Audio Video Bridging (AVB) networks and/or networked devices.

In some embodiments, the subject matter herein includes a system comprising a computing platform having a monitoring and testing module, which may be positioned adjacent to and/or between a pair of networked (i.e., network connected) nodes or devices. The networked nodes or devices may include a "talker" node or device and a "listener" node or device, which collectively form synchronized endpoints for communicating an audio media stream, a video media stream, and/or an audio/video (A/V) media stream in an AVB network.

In some embodiments, the monitoring and testing systems and methods described herein are configured to actively and/or passively monitor and test communications within a network, including communications directed to and/or from any one of the talking and listening devices, communications between the talking and/or listening devices, and/or communication between any devices (e.g., switches, routers, bridges) within the network. The functionality of the monitoring and testing module may also be implemented by the actual talking and listening nodes or devices within an AVB network, for example, by imparting such functionality thereto via additional hardware and/or software, without departing from the scope of the subject matter described herein.

In some embodiments, the monitoring and testing systems and methods described herein are configured to monitor and test performance metrics including time synchronization, latency, and packet jitter required for high quality A/V transmissions over a network. Time synchronization allows for (i) synchronized recording and playback of media stream(s) (e.g., at a same speed) without "jumps"; (ii) synchronizing data from multiple sources of media streams (e.g., multiple cameras, a camera and a microphone, a speaker, etc.) thereby enabling downstream devices to use the multiple signals to produce a combined, aligned result (e.g., combining video from multiple sources to create a combined image with a time difference between the sources); and/or for (iii) synchronizing actions taken at the same time (e.g., starting/stopping recordation of a media stream at multiple recording devices).

In some embodiments, the monitoring and testing systems and methods described herein assure minimum packet jitter, packet delay variation, and/or latency for high-quality A/V applications (e.g., without buffering). Monitoring and testing systems and methods described herein may be used for various high-level or high-quality A/V applications not limited to AVB applications for "live" broadcasts; movie production applications (e.g., having a plurality of A/V recording cameras and microphones); high-definition (HD) streaming applications; security system applications (e.g., security systems using A/V streaming, multiple cameras, etc.); vehicle applications (e.g., autonomous vehicle networks); aircraft applications (e.g., a jet pilot seeing accurate data from a camera in as close to "real-time"); any A/V streaming applications (e.g., from a central location); combinations thereof, and/or use in any and all types of AVB networks and applications.

In some embodiments, the monitoring and testing systems and methods described herein are configurable for operability in a plurality of different modes. As used herein the terms "actively monitor" and/or "active mode" denote instances where the monitoring and testing system generates and inserts or transmits packets (e.g., test packets, emulated packets, etc.) for verifying aspects associated with a network connection. Inserted packets may also be specially coded (e.g., with a source identifier) for authentication purposes, such that data within a secure system is not susceptible to "faking". As used herein, the terms "passively monitor" and/or "passive mode" denote instances where the monitoring and testing system divert and inspect packets, but do not generate and/or insert new packets within the data stream. In the passive mode, the monitoring and testing system is configured to merely pass packets through a monitoring and testing device for monitoring and/or testing purposes.

In some embodiments, systems and methods herein may be configured to test network connected AVB devices (e.g., talker/listener devices), to test the AVB network prior to using the AVB devices, and/or to monitor the network and/or communications between any of the network connected devices during A/V streaming. In some embodiments, the device may alert a user and/or take corrective action based upon the testing and/or monitoring of network communications.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
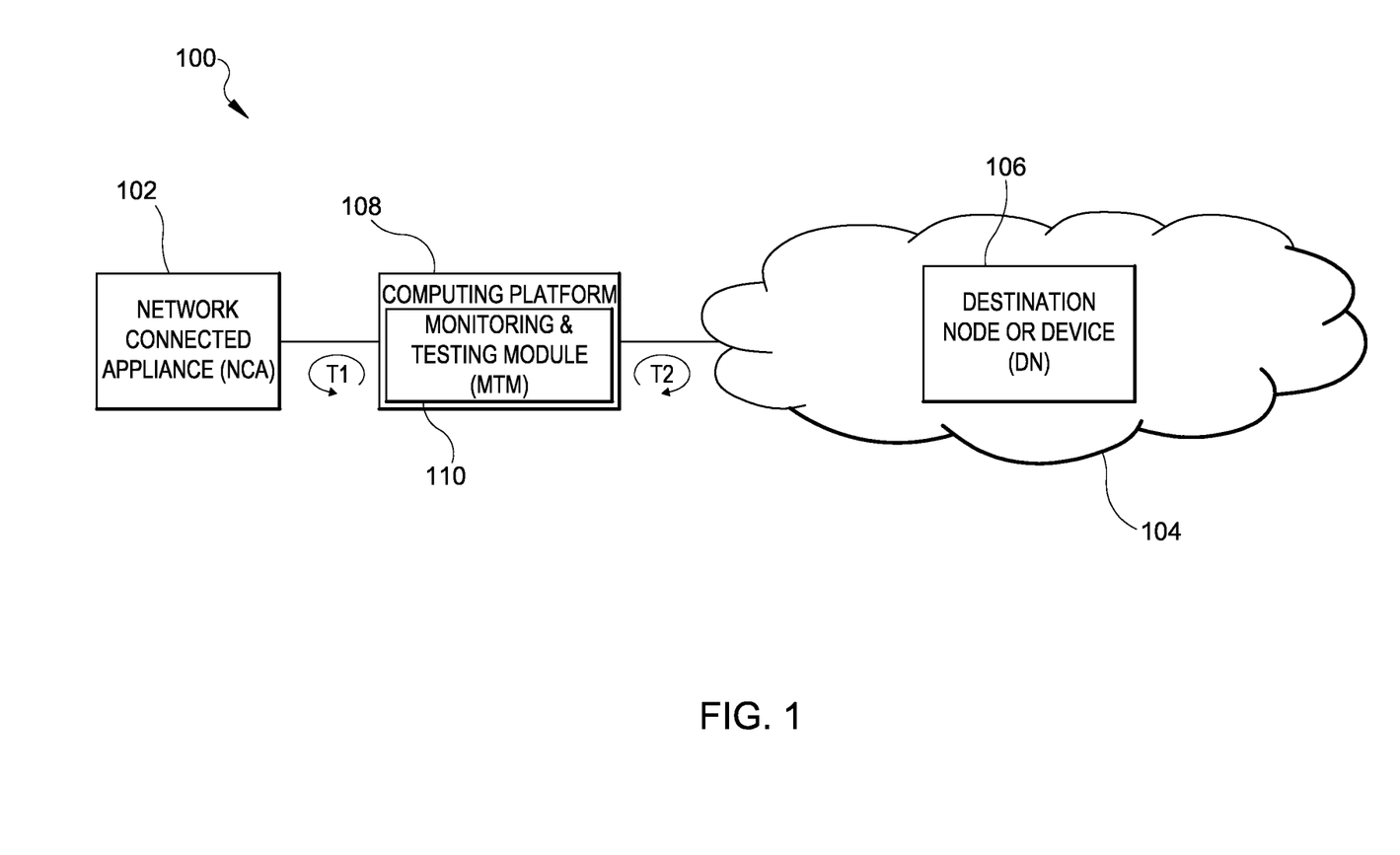
FIG. 1 is a network diagram illustrating an exemplary process for monitoring and testing network communications according to an embodiment of the subject matter described herein.

FIG. 1 illustrates an exemplary system 100 for which any and/or all network communications are monitored and/or tested according to an embodiment of the subject matter described herein. In some embodiments, system 100 includes a monitoring and testing node or device configured to monitor and test network elements, including nodes or devices for transmitting and/or receiving A/V communications (e.g., talker and listener nodes) within a network.

In some embodiments, system 100 includes a communications network 104. Network 104 may include an AVB network through which streams of media packets (e.g., audio, video, and/or A/V data packets) are communicated between endpoints (e.g., a talker and a listener). A plurality of network elements is configured to communicate A/V data via network 104. For example, network 104 includes at least one source node or device (e.g., a talker), such as a network connected appliance (NCA) 102, and at least one destination node or device (DN) 106 (e.g., a listener). For illustration purposes, NCA 102 is illustrated as being disconnected and/or isolated from network 104 by a monitoring and testing module (MTM) for monitoring and testing purposes (e.g., mode 1, mode 2) as described further below. However, NCA 102 and DN 106 may comprise elements of network 104.

In some embodiments, any number of additional network elements (e.g., routers, switches, bridges, etc.) may be provided or disposed along the communication path defined by and/or between NCA 102 and DN 106 for facilitating data communication. In some embodiments, at least one computing platform 108 including a MTM 110 is disposed in the path between NCA 102 and DN 106 for monitoring and testing network 104 and/or elements thereof (e.g., NCA 102, DN 106, etc.). Notably, MTM 110 may include a layer 2 (L2) switch or switching functionality whereby the MTM 110 automatically switches between active and passive testing modes in response to receiving instructions (e.g., a packet carrying instructions) from another node, device, a network operator, and/or a network administrator.

Network 104 may represent any suitable entity or entities (e.g., one or more nodes or devices) associated with sending and/or receiving audio, video, or A/V traffic (e.g., one or more packets). In some embodiments, network 104 may include an AVB network configured to implement a set of protocols being developed by the IEEE 802.1 Audio/Video Bridging Task Group. As used herein, the term "talker" denotes an A/V stream source while "listener" denotes an A/V stream destination. Thus, the talker and listener devices include synchronized endpoint devices (e.g., A/V cameras, microphones, broadcasting equipment, recording equipment, playback equipment, speakers, etc.) for providing synchronized actions including synchronized playback, recording, etc. NCA 102 and DN 106 may be individually synchronized to a system or network clock (not shown) and may also exchange time based packets for maintaining synchronicity. One or more AVB bridges or switches may be disposed between the talkers (e.g., NCA 102) and listener (e.g., DN 106) endpoints for communicating A/V packets there between.

In some embodiments, NCA 102 and DN 106 include endpoint network elements (e.g., computing platforms, devices, and/or nodes) associated with one or more flows (e.g., one or more related packets). For example, NCA 102 may include a talker endpoint, DN 106 may include a listener endpoint, and computing platform 108 may include an in-line AVB device by which communications to, from, and/or between NCA 102 and DN 106 may be monitored or tested via MTM 110. The functionality of computing platform 108 and MTM 110 may also be imparted directly to NCA 102 and/or DN 106 via additional hardware and/or software, without departing from the scope of the subject matter described herein.

In some embodiments, NCA 102, DN 106, and computing platform 108 may each include multiple communications interfaces and may communicate A/V data using a variety of communication protocols. For example, network elements including NCA 102, DN 106, and computing platform 108 may include functionality for communicating or facilitating A/V communications with one or more nodes or modules in network 104. Exemplary communications interfaces within network 104 may include a Real-time Transport Protocol (RTP) interface, a software defined network (SDN) related interface, an Internet protocol (IP) interface, a graphical user interface (GUI), a command line interface (CLI), and/or an application programming interface (API). Exemplary protocols may include an extensible markup language (XML) protocol, a hypertext transfer protocol (HTTP), an IP protocol, a Diameter protocol, an OpenFlow protocol, and/or other protocols.

In some embodiments, NCA 102, DN 106, and/or computing platform 108 may include and/or be hosted by a virtual server and include one or more virtual machines (VM). In this example, NCA 102, DN 106 VMs may be configured to generate, record, transmit, and/or playback media packets associated with one or more flows (e.g., of related packets). Computing platform 108 VMs may be configured to divert, monitor, and/or test data flows communicated from or to NCA 102 and/or DN 106. Computing platform 108 may also actively generate and insert packets (e.g., test packets, encrypted packets, emulated packets, etc.) during communication of a data stream, where desired.

In some embodiments, the talker, NCA 102 and the listener, DN 106 reserve communication resources according to a reservation protocol within network 104 in advance of communicating A/V data for guaranteeing that a communication path between endpoints is available, and for reserving the communication resources defining the path. In some embodiments, computing platform 108 is configured to test the communication path and/or communication resources prior to reserving resources and/or prior to transmission of one or more media streams therethrough via MTM 110. In further embodiments, computing platform 108 is further configured to monitor the communication path between the talker, NCA 102 and listener, DN 106 during transmission of one or more packet media or data streams.

In some embodiments, computing platform 108 and MTM 110 include a single efficient in-line testing device disposed between NCA 102 and DN 106, which is operable and/or configured for operability in a plurality of different "modes" as described herein, for monitoring and/or testing purposes. In other embodiments, the functionality of computing platform 108, including MTM 110, may be embedded within network elements (e.g., NCA 102 "talker" and/or DN 106 "listener") without departing from the scope of the instant subject matter. In some embodiments, computing platform 108, including MTM 110, is operable in at least four different modes as described in Table 1 below, each of which are also described in more detail below.

TABLE 1

| MODE IDENTIFIER | BRIEF DESCRIPTION OF EACH MODE |
| --- | --- |
| Mode 1 (Local test mode) | A single node is locally tested for assessing functionality, the node being tested is only connected to the monitoring and testing module (MTM, e.g., 110 (FIG. 1) or 210 (FIG. 2) |
| Mode 2 (Emulation mode) | MTM 110/210 emulates a talker or listener node for running tests |
| Mode 3 (Bypass or "passive" mode) | MTM 110/210 monitors traffic in both directions for passively monitoring the network for quality |
| Mode 4 (Network test mode) | MTM 110/210 inserts packets within a data stream for running network tests and/or for monitoring the network |

Notably, MTM 110 is configured to automatically change modes (e.g., switch between any of modes 1 to 4) on demand, in some aspects upon detection or receipt of specially coded data packets and/or notifications sent via specially coded packets. For example, a network operator, administrator, or manager may instruct MTM 110 via packet instructions to activate or engage a L2 switch, whereby MTM 110 is enabled for active mode and for generation and insertion of packets. MTM 110 may be operable for testing and/or monitoring one node, a plurality of nodes, and/or an entire network 104 for synchronization verification and quality both before and during packet communications. Notably, computing platform 108 is configured to validate connectivity, reliability, operation, timing measurements (e.g., latency, packet jitter, and/or packet delay variation), synchronization, accuracy, and/or latency within network 104 and/or at one or more nodes thereof, via MTM 110.

Still referring to FIG. 1, aspects of mode 1 and mode 2 are illustrated. Regarding operability in mode 1 and in some embodiments, NCA 102 and/or DN 106 may be tested prior to use in communicating data, for example, at a point in time before any data packets are transmitted, exchanged, and/or communicated along the path between NCA 102 and DN 106. MTM 110 may be used to generate test packets for locally testing NCA 102 prior to transmittal of any data packets by NCA 102 via an active and unidirectional test T1 or test loop, as indicated by the arrowed line. During a local test, NCA 102 may be isolated from and/or disconnected from network 104. In some embodiments, and during mode 1, NCA 102 may only be connected with computing platform 108 having MTM 110 installed thereon and/or executed thereby. MTM 110 is configured to generate, transmit, and exchange packets with NCA 102 to ensure operability of NCA 102 prior to initiating communication of a media stream via NCA 102. NCA 102 may then be connected to network 104 upon verification of its quality and functionality via MTM 110. MTM 110 may also verify that NCA 102 is appropriately synchronized upon connection to network 104.

Regarding operability in mode 2, in some embodiments MTM 110 is configured to emulate a talker node (e.g., NCA 102) or a listener node (e.g., DN 106) for running tests regarding connectivity, reliability, proper installation, proper operability, proper functionality, proper timing, proper synchronization, latency, packet jitter, packet delay variation, combinations thereof, and/or any other tests in regards to network 104 and/or any of the networked elements. When in mode 2, MTM 110 is configured to both receive packets from a media stream and insert (e.g., generate and transmit) packets into the media stream. Thus, in addition to mode 1, mode 2 may also include an active monitoring and/or testing mode.

When operating in mode 2, NCA 102 may be disconnected from network 104 such that MTM 110 may communicate with network 104 on behalf of NCA 102 as indicated by test loop T2. That is, MTM 110 is configured to copy packets received from NCA 102, and emulate NCA 102 upon communicating with network 104. MTM 110 may communicate and/or exchange packets with network 104 and/or elements thereof. Mode 2 may be employed to test various performance metrics (e.g., synchronization, functionality, timing, packet jitter, packet delay variation, latency, etc.) associated with network 104, network elements (e.g., DN 106), and/or any or all communications therewith. Mode 2 may also be useful in running tests where the presence of the emulated device (e.g., NCA 102) would interfere with the test (e.g., test loop T2).

Whether operating in mode 1 or mode 2, MTM 110 may be configured to receive, divert, and/or intercept some, any, or all communications to, from, and/or within network 104 for testing and monitoring purposes. In some embodiments, NCA 102, network 104, and/or DN 106 may be tested before communicating A/V data, for example, when the elements are negotiating a path and/or exchanging synchronized packets having synchronized frames for verifying timing within network 104. As mentioned above, synchronization is important for facilitating synchronized recording or playback of a media stream at endpoints, synchronizing multiple media streams, and for performing actions (e.g., starting or stopping of recording) at a same time.

Figure 2:
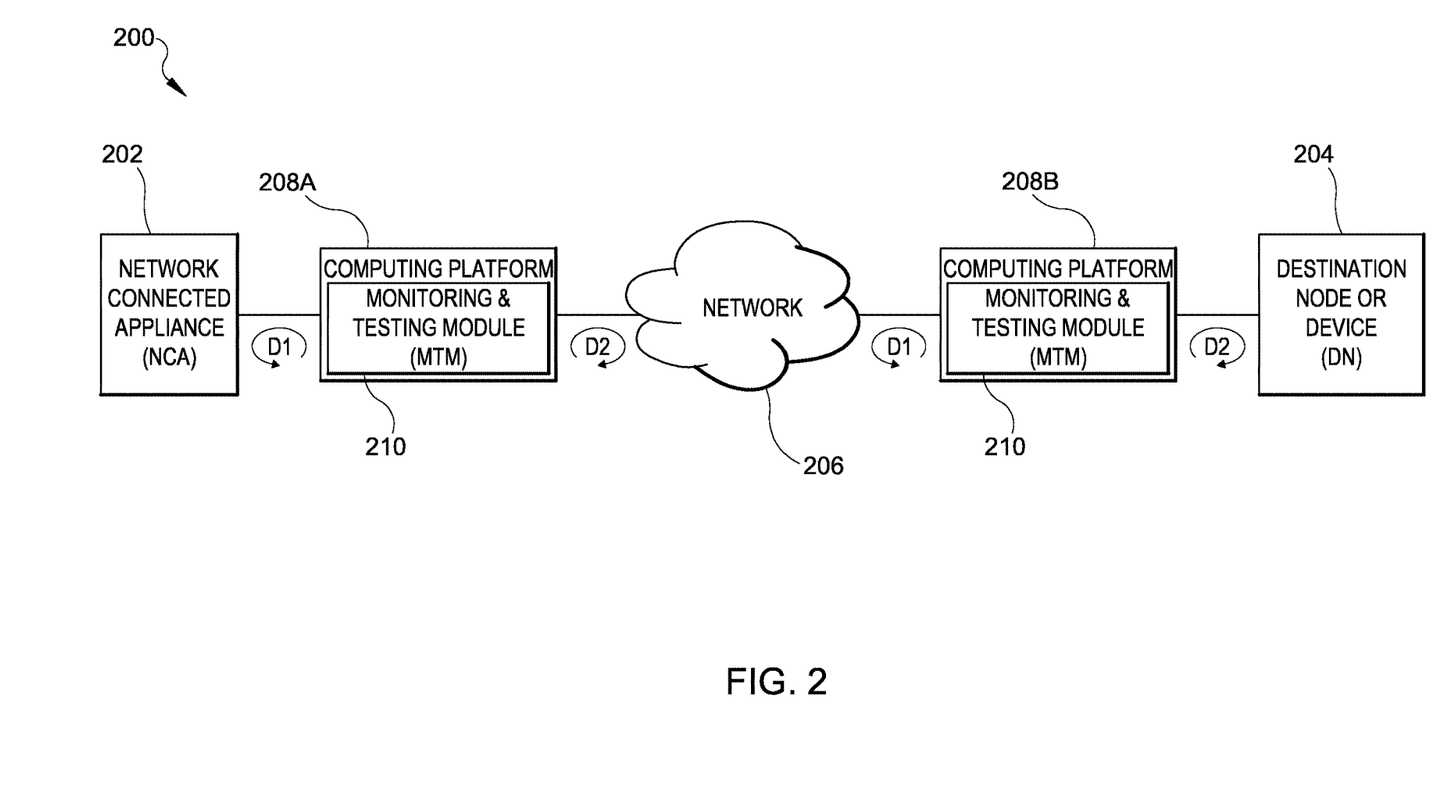
FIG. 2 is a network diagram illustrating another exemplary process for monitoring and testing network communications according to another embodiment of the subject matter described herein.

FIG. 2 illustrates an exemplary system 200 for which any and/or all network communications are monitored and/or tested according to an embodiment of the subject matter described herein. In some embodiments, system 200 includes a plurality of monitoring and testing nodes or devices for monitoring and testing a plurality of network elements, including nodes or devices for transmitting and/or receiving A/V communications (e.g., talker and listener nodes) within a network. Components in FIG. 2 are similar to those described in FIG. 1 above; however, system 200 includes more than one (e.g. multiple) testing nodes or devices are provided for illustrating operability in modes 3 and 4, discussed briefly above in Table 1.

Notably, monitoring and testing devices as described herein (e.g., MTMs) are each configurable in a plurality of different modes (e.g., mode 1 to mode 4), which may be active, passive, and automatically interchanged as needed upon receiving packet instruction (e.g., packets including unique identifiers, specially coded headers, etc.) to the MTMs described herein. The specially coded packets may designate an operating mode. If a mode is not designated, MTMs described herein may be configured to operate in a default mode, which, in some embodiments is mode 3.

In some embodiments, system 200 includes a source or talker endpoint including NCA 202. NCA 202 may include the source endpoint of one or more media streams. System 200 further includes a destination or listener endpoint DN 204 which is synchronized with NCA 202. DN 204 may include the destination endpoint of the one or more media streams. The endpoints may communicate with each other via transmitting packets across and/or through a network 206, which in some embodiments includes an AVB network. System 200 further includes a plurality of computing platforms, such as a first computing platform 208A and a second computing platform 208B at which monitoring and testing equipment may be provided or installed. In some embodiments, each computing platform 208A and 208B includes a MTM 210.

Each computing platform 208A and 208B may include an in-line AVB device by which communications to, from, and/or between NCA 202 and DN 204 may be diverted for monitoring or testing via at least one MTM 210. The functionality of MTM 210 may also be imparted directly to talker NCA 202 and/or listener DN 204 via additional hardware and/or software, without departing from the scope of the subject matter described herein.

In some embodiments, NCA 202, DN 204, and computing platforms 208A and 208B may include multiple communications interfaces and may communicate A/V data using a variety of protocols. For example, network elements including NCA 202, DN 204, and computing platforms 208A and 208B may include functionality for communicating or facilitating A/V communications with one or more nodes or modules in network 206.

Network 206 may include an AVB network through which streams of media packets (e.g., audio, video, and/or A/V data packets) are communicated. A plurality of network elements may be configured to communicate A/V data within and/or through network 206. For example, at least one source node or device (e.g., NCA 202) is configured to communicate with at least one destination node or device (e.g., DN 204) via network 206. Any number of additional network elements (e.g., routers, switches, bridges, etc.) may be provided or disposed along the communication path defined by and/or between NCA 202 and DN 204 for facilitating data communication. In some embodiments, each computing platform 208A and 208B includes an MTM 210 disposed in the path between NCA 202 and DN 204 for monitoring and testing network 206 and/or elements thereof. In some embodiments, first computing platform 208A is disposed at and/or in-line with NCA 202 and second computing platform 208B is disposed at and/or in-line with DN 204.

Network 206 represents any suitable entity or entities (e.g., one or more nodes or devices) associated with sending and/or receiving audio, video, or A/V traffic (e.g., one or more packets). In some embodiments, network 206 may include an AVB network configured to implement a set of protocols being developed by the IEEE 802.1 Audio/Video Bridging Task Group. In some embodiments, NCA 202 and DN 204 include synchronized endpoints (e.g., A/V cameras, microphones, broadcasting equipment, recording equipment, playback equipment, etc.) for providing synchronized playback, recording, etc. NCA 202 and DN 204 may be individually synchronized to a system or network clock (not shown) and/or NCA 202 and DN 204 may exchange time based packets for maintaining synchronicity.

Still referring to FIG. 2, aspects of mode 3 and mode 4 are illustrated. In some embodiments, mode 3 may include a default mode in which MTMs 210 are configured to passively monitor network communications. For example, mode 3 may include a bypass mode, in which NCA 202 and DN 204 communicate via network 206, and MTMs 210 divert, intercept, inspect, and passively monitor network traffic in at least two directions, D1 and D2. MTMs 210 may not generate and/or insert packets within the data stream during operation in mode 3. MTMs 210 are configured to passively monitor network 206 and components thereof (e.g., NCA 202, DN 204, etc.) for quality, and detect specially coded messages or packets in which the mode of operation may be automatically changed. Specially coded packets destined for MTMs 210 may not seen by the other devices (e.g., NCA 202, DN 204, etc.) in network 206.

As FIG. 2 illustrates, at least one MTM 210 may be provided in-line with NCA 202 having functionality to passively monitor communications between NCA 202 and network 206, where the term "passively" monitoring refers to a mode where MTM 201 does not generate and insert packets into a media stream. Rather, MTM 210 intercepts and tests or monitors packets passing from NCA 202 prior to reaching network 206. MTM 210 is configured to monitor packets destined for network 206 by isolating the packets and diverting or passively tapping into the media stream.

As FIG. 2 illustrates, at least one MTM 210 may also provided in-line with DN 204 having functionality to passively monitor communications between network 206 and DN 204. MTM 210 may be configured to divert, intercept, and test or monitor packets prior to the packets being received by DN 204. Each MTM 210 may test and monitor a media stream for assuring timing, assuring quality (e.g., minimized latency, packet jitter, and packet delay variation), assuring reliability of the network and/or components thereof, assuring operability and/or functionality of the network and/or components thereof, assuring accuracy, etc.

Regarding operability in mode 3 and in some embodiments, communications directed from or to NCA 202 and/or DN 204 may be passively monitored and tested in situ, or while data is being communicated (e.g., streamed) between endpoints (e.g., NCA 202, DN 204). For example, MTM 210 may passively test and/or monitor packets during transmission, exchange, and/or communication of data packets along the path between NCA 202 and DN 204 for detecting quality, functionality, operability, and/or synchronization, latency, packet jitter, or packet delay variation. As FIG. 2 illustrates, each MTM 210 may be used to bi-directionally test a data stream (e.g., bi-directionally test/monitor a data stream) as indicated by the arrowed lines or directions D1 and D2. During a passive testing/monitoring or bypass testing/monitoring mode (e.g., mode 3), NCA 202 and/or DN 204 may be isolated from network 206 via MTM 110.

Regarding operability in mode 4, MTM 210 may be configured to test the network. In this mode, each networked device (e.g., NCA 202, DN 204) may transmit and/or receive data, and MTMs 210 may also generate and insert packets into the data stream data stream for running network tests and/or for monitoring the network or network communications. Mode 4 may be used, in some embodiments, to run networks tests while NCA 202 and DN 204 are streaming data to assure network quality. In some embodiments, each MTM 210 may be configured to alert a user or network operator and/or take corrective actions based upon the testing and/or monitoring of network communications.

In an exemplary embodiment, mode 4 allows generation and insertion of unique flows or groups of packets into the data stream, which identify the computing platform as a testing and/or monitoring source. This is advantageous, for example, in security applications (e.g., having remote security cameras, etc.) as it provides an encrypted and/or authenticated data stream. This may provide more robust security systems which can prevent "faking" of data, as MTM 210 includes an intelligent agent configured to insert specially identified packets.

It will be appreciated that FIGS. 1 and 2 are for illustrative purposes only and that various nodes and/or modules, locations, and/or functionality described above in relation to FIG. 1 may be changed, altered, added, or removed.

Figure 3:
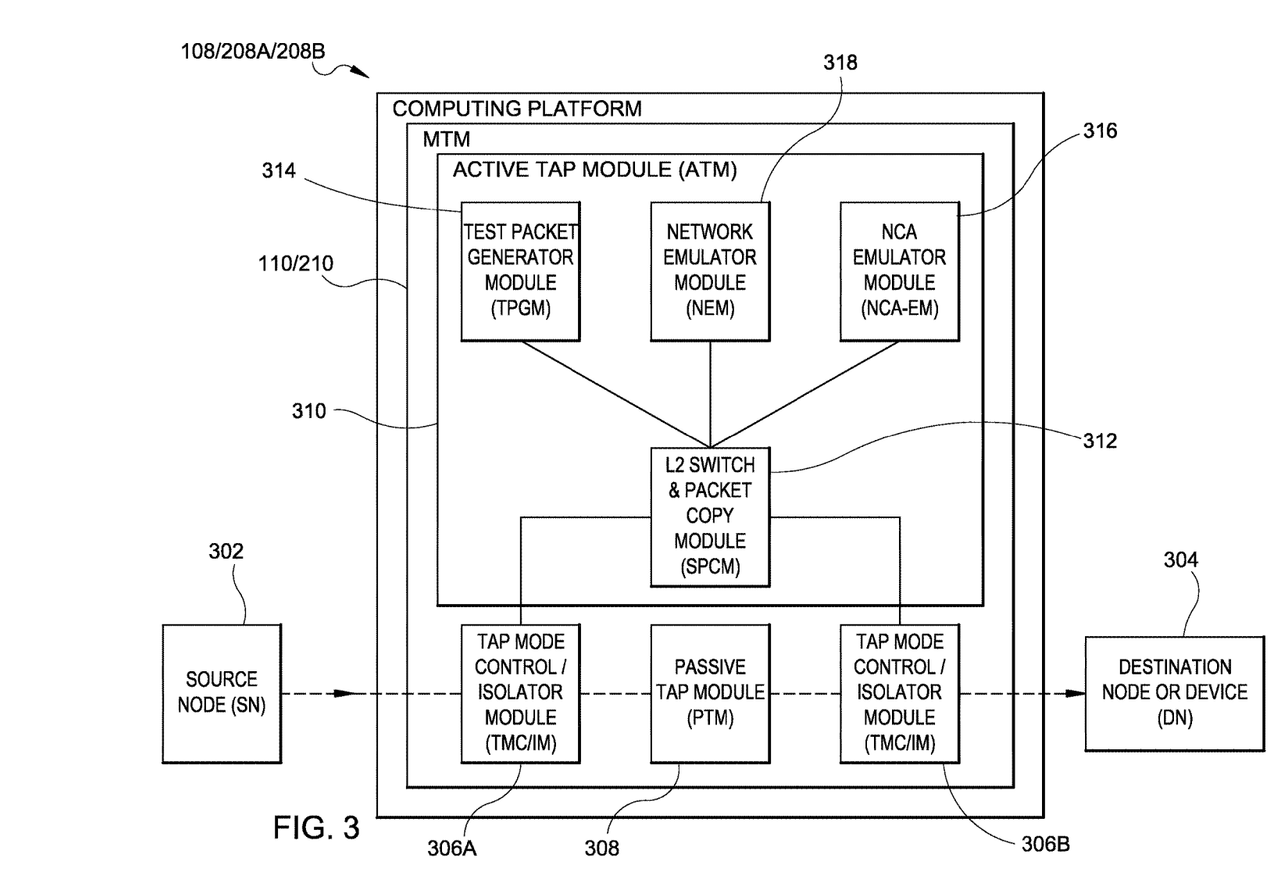
FIG. 3 is a block diagram illustrating the computing platform for monitoring and testing network communications according to an embodiment of the subject matter described herein.

FIG. 3 is a block diagram illustrating computing platforms described herein (e.g., 108/208A/208B), which include functionality for monitoring and testing network communications according to embodiments of the subject matter described herein. Computing platform 108/208A/208B includes at least one MTM 110/210 configured to monitor and test network communications. In some embodiments, MTM 110/210 may be implemented as a single entity at a single computing platform. In other embodiments, MTM 110/210 may be implemented as a distributed entity across multiple computing devices or platforms. For example, MTM 110/210 may be implemented as a software module executing on processors associated with computing platform 108/208A/208B and/or other entities, such as network elements 102, 106, 202, 204, etc.

In some embodiments, MTM 110/210 is disposed between a source node (SN) 302 and a destination node or device (DN) 304 for monitoring and/or testing the devices (e.g., synchronization, timing, latency, packet jitter, packet delay variation, quality, functionality, etc.) both before data transmission and/or at any time during data transmission. Packet headers, routing tables, and/or combinations thereof may be used to divert or route flows or media streams (e.g., audio data, video data, and/or A/V data) through MTM 110/210.

In some embodiments, packets originating from at least one talker node and/or destined for at least one listener node may be passively monitored or tested and/or actively tested or monitored (e.g., copied and emulated) via MTM 110/210. In some embodiments, MTM 110/210 identifies and intercepts media packets originating from a talker and/or destined for a listener are identified via routing information and/or unique data structures included in a media packet header. Routing information and/or unique data structures may include or identify a path assignment, a path identifier, a unique identifier, a flow tuple, or any other suitable identifier which MTM 110/210 may access from a storage device not limited to a database, a hash table, an associative array, and/or a content-addressable memory (CAM).

In other embodiments, packets may be automatically diverted or routed through MTM 110/210 via control plane assignments and/or stream reservation protocols. Routing information may include a path assignment table, where each entry in the path assignment table may include an association between one or more destination nodes and a path identifier (e.g., VLAN identifier, a MPLS label, or a path label) that affects the data path a packet traverses. Exemplary assignment values for causing media to route through MTM 110/210 may include a flow tuple or other identifier, a hash of a flow tuple or other identifier, and/or data in a key-value data structure.

In some embodiments, MTM 110/210 may communicate with one or more of network connected devices (e.g., SN 302 or DN 304) or modules using an interface, for example, an RTP interface, a SDN related interface or any other suitable interface. Exemplary SDN related interfaces may include an OpenFlow protocol interface or a Diameter protocol interface.

When in a default monitoring and testing mode (e.g., a passive, bypass mode, mode 3) as described above, packets from network elements, including one of SN 302 and DN 304, may be routed or diverted into MTM 110/210 and to a Passive Tap Module (PTM) via one or more Tap Mode Control/Isolator Modules (TMC/IMs). For example, packets may encounter a first TMC/IM 306A configured to route packets into PTM 308 when computing platform is operable in a default mode (e.g., mode 3). When in an active mode (e.g., modes 1, 2, or 4) first TMC/IM 306A may route packets to an Active Tap Module (ATM) 310. After packets are tested or monitored via PTM 308, the packets may then exit MTM 110/210 and be directed towards DN 304 via a second TMC/IM 306B.

In some embodiments, when in a passive mode, packets may be directed along the path designated by broken lines. For example, ingress and egress packets associated with one or more AVB network connected nodes or devices in an AVB network, or packets flowing between nodes (e.g., SN 302, DN 304) within an AVB network may be routed through MTM 110/210 and passively monitored via PTM 308. PTM 308 is configured to monitor packet timing for detection/inspection of synchronization, latency, packet delay variation and/or packet jitter. PTM 308 is also configured to monitor network quality and/or operability of SN 302 and/or DN 304. In some embodiments, PTM 308 may be configured to alert another network element (e.g., a node, device, module, system component, system operator, administrator, etc.) and/or initiate a corrective action based upon the testing and/or monitoring of network communications.

In some embodiments, MTM 110/210 is configured to operate in the default mode (e.g., passive/bypass mode 3) until triggered to engage a L2 switch for copying, emulating, and/or transmitting packets, thereby initiating or engaging in an active mode. MTM 110/210 may be triggered to engage an active mode upon receiving specially coded packets that signal, alert, or otherwise trigger computing platform 108/208A/208B to switch between a passive mode and one or more active modes as described above.

In some embodiments, when in an active mode, packets pass into ATM 310 via a L2 Switch and Packet Copy Module (SPCM) 312. The flow path within ATM 310 is designated in solid lines. Packets are directed into and out of SPCM 312 via TMC/IM 306A and/or 306B as indicated by the solid lines extending from TMC/IM 306A and 306B. Once SPCM 312 is engaged, MTM 110/210 may actively generate and transmit packets to network elements for testing network communications, network devices, authentication of and/or ensuring security of the data stream, and/or combinations thereof.

For example, in mode 1, a single network element (e.g., SN 302, DN 301, etc.) may be actively tested via TPGM 314. When in mode 1, SN 302 and/or DN 304 may be disconnected from a communications network and only communicate with MTM 110/210 via ATM 310 and SPCM 312. SN 302 or DN 304 may be tested for assessing functionality and/or operability before transmission of a media stream and/or media packets between SN 302 and DN 304. In some aspects, TPGM 314 is configured to generate test packets for running local tests of SN 302 or DN 304 for ensuring that the device is functional. This may advantageously reduce the amount of control plane traffic in reserving and allocate resources (e.g., adhering to stream reservation protocols), as defective resources may be weeded out ahead of time in advance of performing the stream reservation protocol. MTM 110/120 may generate test packets via TPGM 314 and output the test packets to the tested node via SPCM 312 and TMC/IM 306A or 306B.

In mode 2, MTM/210 110 is configured to emulate a network connected device or apparatus (NCA) such as a talker node (e.g., SN 302) or a listener node (e.g., DN 304) for running tests regarding connectivity, reliability, proper installation, proper operability, proper functionality, proper timing, proper synchronization, latency, packet jitter, packet delay variation combinations thereof, and/or any other tests in regards to an AVB network and/or any of the AVB networked elements. When in mode 2, MTM 110/210, using ATM 310, is configured to both receive packets from a media stream and insert (e.g., generate and transmit) packets into the media stream.

For example and when operating in mode 2, ATM 310 is configured to emulate a network connected appliance (NCA, e.g., SN 302) via an NCA Emulator Module (NCA-EM) 316. In some aspects, SPCM 312 is adapted to copy packets diverted from SN 302, and emulate the packets via NCA-EM 318 for testing purposes. A network and/or elements thereof (e.g., DN 304) may receive the emulated packets generated and transmitted by MTM 110/210, however, such packets appear to come from SN 302. MTM 110/210 thus communicates with other nodes and/or the network in general as a proxy for SN 302. When in emulation mode, SN 302 may be disconnected with the remainder of the network, and all communications to DN 304 may be copied and generated at MTM 110/210 via NCA-EM 316. This may be useful for running tests on the network where the presence of SN 302 would interfere with the test. Mode 2 may be employed to test various performance metrics (e.g., synchronization, functionality, timing, packet delay variation, packet jitter, latency, etc.) associated with network 104, network elements (e.g., DN 106), and/or communications therewith.

In mode 4, MTM 210 is configured to test the network, for example, by emulating a network device (e.g., a router, gateway, switch, etc.) In mode 2 described above, the talker (e.g., NCA or SN 302) may be emulated. In mode 4, any other network device may be emulated. In this mode, MTM 110/210 may actively generate, transmit, and insert packets into the data stream data stream for running network tests and/or for monitoring the network during transmission of a media stream. Packets (e.g., instructions for automatic switching between active and passive modes) destined for MTM may not be seen by and/or encountered by other devices (e.g., SN 302, DN 304) within and/or connected to network 206. Mode 4 may be used, in some embodiments, to run networks tests while SB 302 and DN 304 are actively streaming data to assure network quality. MTM 110/210 may also be configured to alert another network element and/or a network operator to implement corrective actions based upon the testing and/or monitoring of network communications.

Figure 4:
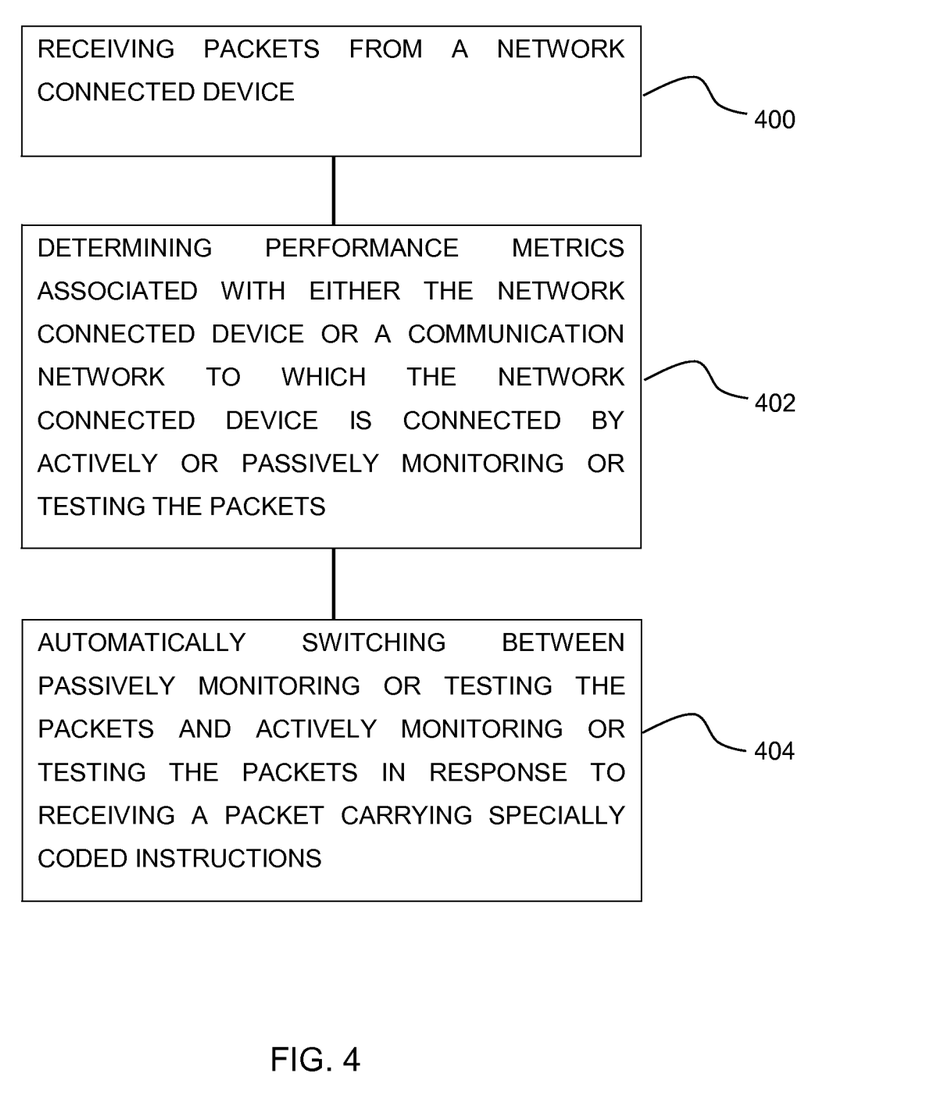
FIG. 4 is a block diagram illustrating an exemplary process for monitoring and testing network communications according to an embodiment of the subject matter described herein.

FIG. 4 is a block diagram illustrating an exemplary process for monitoring and testing network communications according to an embodiment of the subject matter described herein. In some aspects, the process is performed at a computing platform including a MTM (e.g., FIGS. 1-3).

In block 400, a packet data stream carrying audio, video, or audio/video (A/V) data from a network connected device may be received at the computing platform. The functionality of the computing platform may be disposed at a single node, across multiple nodes, and/or embedded within synchronized endpoints (e.g., talker and listener nodes) without departing from the scope of the instant subject matter.

In block 402, various performance metrics associated with either the network connected device or a communications network to which the network connected device is connected are determined by actively or passively monitoring or testing packets within the packet data stream.

Various performance metrics of either the network connected device (e.g., SN 302, DN 304) or the network to which the network connected device is connected (e.g., an AVB network) may be monitored or tested by examining the packet data stream. For example, the computing platform is configured to monitor and/or test various performance metrics or aspects including connectivity of network connected device, reliability of the network and/or network connected device, operability of the network connected device, packet timing, synchronization, accuracy, latency, packet delay variation, and/or packet jitter.

In some embodiments, the packets in a packet data stream may be diverted to the computing platform and passively monitored and/or tested, or actively monitored and/or tested. During passive monitoring or testing (e.g., mode 3, the default mode) packets in a packet data stream are passively inspected via a PTM (FIG. 3). During active monitoring or testing, the packet data stream is diverted to computing platform and packets are actively tested and/or inspected via an ATM (FIG. 3). As noted above, the term "actively tested" refers to the ATMs ability to generate and insert packets within the packet data stream. The ATM may generate new test packets or copy and emulate another device.

In block 404, the computer platform is configured to automatically switch between passively monitoring or testing the packet data stream and actively monitoring or testing the packet data stream in response to receiving specially coded packet instructions. Specially coded packet instructions include packets containing unique routing information and/or unique data structures for identifying a path assignment. For example, the specially coded packet instructions may include a packet having a unique path identifier, a unique identifier, a flow tuple, or any other suitable identifier.

The subject matter described herein for testing and monitoring network communications improves the functionality of networks and/or networked devices by providing more efficient and effective resource utilization. The subject matter herein tests and monitors network communications in an AVB network for minimizing the amount of control plane traffic in reserving and allocating AVB network elements while improving confidence that the network will meet and adhere to stream reservation protocols. It should also be noted that a computing platform that implements the subject matter described herein includes a special purpose computing device usable to test and monitor network communications, namely communications in an AVB network.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for monitoring and/or testing network communications, the method comprising:
   at a computing platform comprising a Layer 2 (L2) switch:
      receiving packets from a network connected device;
      determining performance metrics associated with either the network connected device or a communications network to which the network connected device is connected by actively or passively monitoring or testing the packets;
      detecting a specially coded packet instruction; and
      engaging the L2 switch in response to detecting the specially coded packet instruction and automatically switching the computing platform from a passive mode to an active mode, wherein, in the passive mode, the computing platform monitors existing packets that traverse the computing platform using a passive tap module but does not insert test packets into the communications network; and
   after switching from the passive mode to the active mode, emulating the network connected device by generating and sending test packets that appear to originate from the network connected device, wherein the test packets originate from the computing platform and not the network connected device, wherein the test packets bypass the passive tap module.

2. The method of claim 1, wherein the communications network comprises an Audio Video Bridging (AVB) network.

3. The method of claim 1, wherein the packets include audio, video, or audio/video (A/V) packets.

4. The method of claim 1, wherein the network connected device includes an audio/video (A/V) recording camera, a microphone, a speaker, broadcasting equipment, recording equipment, or A/V playback equipment.

5. The method of claim 1, wherein determining performance metrics includes verifying at least one of:
   connectivity of the network connected device, connectivity of the communications network, operability of the network connected device, quality of the communications network, reliability of the communications network, reliability of the network connected device, packet timing, synchronization of the network connected device, latency, packet jitter, packet delay variation, or combinations thereof.

6. The method of claim 1, wherein engaging the L2 switch comprises routing the packets from a passive testing module (PTM) to an active testing module (ATM).

7. The method of claim 1, wherein the network connected device only communicates with the computing platform.

8. The method of claim 1, further comprising generating one or more test packets and transmitting the one or more test packets to the network connected device.

9. The method of claim 8, wherein the one or more test packets emulate a network communication.

10. The method of claim 1, further comprising generating one or more test packets and inserting the one or more test packets in a media stream flowing between the network connected device and a destination node.

11. The method of claim 1, further comprising copying the packets received from the network connected device, emulating the packets copied from the network connected device, and transmitting the emulated packets to at least one other network connected device.

12. The method of claim 1, further comprising passively monitoring a plurality of packets exchanged between a plurality of network connected devices.

13. The method of claim 1, wherein the network connected device comprises an audio/video (A/V) source node, and wherein the packets are received at the computing platform prior to communication of an A/V data stream from the A/V source node to a destination node.

14. A system for monitoring and/or testing network communications, the system comprising:
- a computing platform comprising at least one processor and a Layer 2 (L2) switch; and
- a monitoring and testing module (MTM) implemented via the at least one processor, wherein the MTM is configured to:
  - receive packets from a network connected device;
  - determine performance metrics associated with either the network connected device or a communications network to which the network connected device is connected by actively or passively monitoring or testing the packets;
  - detect a specially coded packet instruction;
  - engage the L2 switch in response to detecting the specially coded packet instruction for automatically switching the computing platform from a passive mode to an active mode, wherein, in the passive mode, the MTM monitors existing packets that traverse the computing platform using a passive tap module but does not insert test packets into the communications network; and
  - after switching from the passive mode to the active mode, emulating the network connected device by generating and sending test packets that appear to originate from the network connected device, wherein the test packets originate from the computing platform and not the network connected device, wherein the test packets bypass the passive tap module.

15. The system of claim 14, wherein the communications network comprises an Audio Video Bridging (AVB) network.

16. The system of claim 14, wherein the packets include audio, video, or audio/video (A/V) packets.

17. The system of claim 14, wherein the network connected device includes an audio/video (A/V) recording camera, a microphone, a speaker, broadcasting equipment, recording equipment, or A/V playback equipment.

18. The system of claim 14, wherein the performance metrics include at least one of connectivity of the network connected device, connectivity of the communications network, operability of the network connected device, quality of the communications network, reliability of the communications network, reliability of the network connected device, packet timing, synchronization of the network connected device, latency, packet jitter, packet delay variation, or combinations thereof.

19. The system of claim 14, wherein the L2 switch is configured to route the packets from a passive testing module (PTM) of the computing platform to an active testing module (ATM) of the computing platform.

20. The system of claim 14, wherein the network connected device only communicates with the computing platform.

21. The system of claim 14, wherein the MTM is configured to generate one or more test packets and transmit the one or more test packets to the network connected device.

22. The system of claim 21, wherein the one or more test packets emulate a network communication.

23. The system of claim 14, wherein the MTM is configured to generate one or more test packets and insert the one or more test packets in a media stream that flows between the network connected device and a destination node.

24. The system of claim 14, wherein the MTM is configured to copy the packets received from the network connected device, emulate the packets copied from the network connected device, and transmit the emulated packets to at least one other network connected device.

25. The system of claim 14, further comprising a passive testing module (PTM) configured to passively monitoring a plurality of packets exchanged between a plurality of network connected devices.

26. The system of claim 14, wherein the network connected device comprises an audio/video (NV) source node, and wherein the packets are received at the computing platform prior to communication of an A/V data stream from the A/V source node to a destination node.

27. A non-transitory computer readable medium comprising computer executable instructions embodied in the non-transitory computer readable medium that when executed by a processor of a computer perform steps comprising:
- receiving packets from a network connected device;
- determining performance metrics associated with either the network connected device or a communications network to which the network connected device is connected by actively or passively monitoring or testing the packets;
- detecting a specially coded packet instruction; and
- engaging a Layer 2 (L2) switch in a computing platform in response to detecting the specially coded packet instruction and automatically switching the computing platform from a passive mode to an active mode, wherein, in the passive mode, the computing platform monitors existing packets that traverse the computing platform using a passive tap module but does not insert test packets into the communications network; and
- after switching from the passive mode to the active mode, emulating the network connected device by generating and sending test packets that appear to originate from the network connected device, wherein the test packets originate from the computing platform and not the network connected device, wherein the test packets bypass the passive tap module.

* * * * *